United States Patent
Tochio

(10) Patent No.: US 7,821,971 B2
(45) Date of Patent: Oct. 26, 2010

(54) PROTECTION PROVIDING METHOD AND CUSTOMER EDGE APPARATUS

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 12/230,608

(22) Filed: Sep. 2, 2008

(65) Prior Publication Data

US 2009/0010182 A1 Jan. 8, 2009

Related U.S. Application Data

(63) Continuation of application No. PCT/JP2006/306273, filed on Mar. 28, 2006.

(51) Int. Cl.
- H04L 12/28 (2006.01)
- G06F 15/173 (2006.01)
- G06F 15/16 (2006.01)

(52) U.S. Cl. .................. 370/255; 709/225; 709/228; 709/239

(58) Field of Classification Search .......... 370/254
See application file for complete search history.

(56) References Cited

U.S. PATENT DOCUMENTS

| | | | |
|---|---|---|---|
| 2005/0044262 A1* | 2/2005 | Luo | 709/238 |
| 2006/0047851 A1* | 3/2006 | Voit et al. | 709/239 |
| 2006/0187855 A1* | 8/2006 | Booth et al. | 370/254 |
| 2007/0008982 A1* | 1/2007 | Voit et al. | 370/401 |
| 2007/0133406 A1* | 6/2007 | Vasseur | 370/230 |
| 2007/0280267 A1* | 12/2007 | Ould-Brahim | 370/395.53 |

FOREIGN PATENT DOCUMENTS

| | | |
|---|---|---|
| JP | 2000-209227 | 7/2000 |
| JP | 2002-374288 | 12/2002 |

OTHER PUBLICATIONS

Bryant et al, RFC 3985: Pseudo Wire Edge-to-Edge (PWE3) Architecture, Mar. 2005, Internet Engineering Task Force Network Working Group.*
Tomonori Takeda et al., "UNI Model ni Okeru Yobi Path Settei Hoho no Kento", 2006 Nen The Institute of Electronics, Information and Communication Engineers Sogo Taikai B-12-4, Mar. 8, 2006.
Hidehiko Mihori et al., "Type-X ni yoru Koshinrai MPLS Managed Network no Jitsugen", NTT Gijutsu Journal, vol. 15, No. 6, The Telecommunications Association, pp. 8 to 11, Jun. 1, 2003.
International Search Report mailed on Jun. 6, 2006 in connection with International Application No. PCT/JP2006/306273.

* cited by examiner

*Primary Examiner*—William Trost, IV
*Assistant Examiner*—Andrew Chriss
(74) *Attorney, Agent, or Firm*—Staas & Halsey LLP

(57) ABSTRACT

The present invention provides a protection providing method in a network configuration having a customer edge apparatus redundantly connected to a first provider edge apparatus and a second provider edge apparatus for setting a primary provider edge apparatus and a secondary provider edge apparatus with the customer edge apparatus. The first provider edge apparatus transmits a first signaling message received when establishing a pseudowire to the customer edge apparatus. The second provider edge apparatus also transmits a second signaling message received when establishing a pseudowire to the customer edge apparatus. The customer edge apparatus compares the first and second signaling messages and sets the primary provider edge apparatus and the secondary provider edge apparatus.

8 Claims, 12 Drawing Sheets

(RELATED ART)

PROTECTION PROVIDING METHOD AND CUSTOMER EDGE APPARATUS

CROSS-REFERENCE TO RELATED APPLICATION

This application is a U.S. continuation application filed under 35 USC 111(a) claiming benefit under 35 USC 120 and 365(c) of PCT application JP2006/306273, filed Mar. 28, 2006. The foregoing application is hereby incorporated herein by reference.

BACKGROUND OF THE INVENTION

1. Field of the Invention

The present invention generally relates to a protection providing method for setting a primary provider edge apparatus and a secondary provider edge apparatus with a customer edge apparatus in a network configuration where the customer edge apparatus is redundantly connected to a first provider edge apparatus and a second provider edge apparatus, and a customer edge apparatus thereof.

2. Description of the Related Art

A technology referred to as MPLS (Multi-Protocol Label Switching) is drawing attention as a recent packet transmission technology. MPLS is a technology that realizes high speed transmission by applying a label to a packet. In the IETF (Internet Engineering Task Force), studies are being conducted on PWE3 (Pseudo Wire Emulation Edge-to-Edge) which uses MPLS as a pseudowire (PW: Pseudowire) and provides existing services (e.g., FR (Frame Relay), ATM (Asynchronous Transfer Mode), TDM (Time-Division Multiplexing), Ethernet (Registered Trademark) from end-to-end (point-to-point). Since MPLS can be used as a pseudowire for merging various services, MPLS is anticipated to be utilized for carrier networks.

FIG. 1 shows a reference model of PWE3 model described in RFC (Request For Comment) 3916 and RFC 3985. The reference model PWE3 includes a customer edge apparatus used by a user for accessing a provider (referred to as CE (Customer Edge) apparatus) CE1, CE2 and a provider edge apparatus (referred to as PE (Provider Edge) apparatus) PE 1, PE2. The PE apparatus is connected to the CE apparatus via an attachment circuit and also to a P (Provider) apparatus serving as the backbone of the provider.

In order to provide the End-to-End service via a PSN (Packet Switched Network), a virtual tunnel referred to as a PSN (Packet Switched Network) tunnel is established between the PE apparatus PE1 and the PE apparatus PE2. In order to create this tunnel, MPLS or a technology referred to as L2TP (Layer 2 Tunneling Protocol) can be used. Then, by establishing the pseudowires PW1, PW2 inside the tunnel, End-to-End services can be provided between the CE apparatus CE1 and the CE apparatus CE2.

As described above, since the MPLS provides End-to-End services and is anticipated to be utilized for carrier networks, high reliability is desired. In order to achieve high reliability, there is a need for a technology, so called protection technology, that provides a line to be used as a secondary line in a case where failure occurs in a transmission path or a communication apparatus.

As for existing protection technology, there is protecting of a path between PE apparatuses (i.e. LSP (Label Switched Path). One example of the technology is a Fast Reroute (RFC 4090) in which data are routed around a primary LSP to access a secondary LSP when a failure occurs in the primary LSP. As an exemplary technology for switching from a primary LSP to a secondary LSP, a secondary LSP is set beforehand so that a path can be searched and a LSP can be switched to a secondary LSP when a failure occurs, as described in Japanese Laid-Open Patent Application No. 2002-374288.

However, this protection technology is to be applied to a redundant configuration of a path between PE apparatuses as shown in FIG. 2(a) but not a redundant configuration of a path between PE apparatuses as shown in FIG. 2(b). In other words, this protection technology is not configured to allow CE apparatuses CE1, CE2 to switch from main use PE apparatuses PE1a, PE2a to auxiliary PE apparatuses PE 1b, PE 2b.

In order to provide the redundant configuration of the PE apparatuses shown in FIG. 2(b) by using a related art example, the CE apparatuses CE1, CE2 require a technology that selects a primary PE apparatus and a secondary PE apparatus (or a primary pseudowire or a secondary pseudowire) and a technology that provides protection in view of the End-to-End service between the CE apparatus CE1 and the CE apparatus CE2.

In a case where Ethernet (Registered Trademark) is used as the End-to-End service, a spanning tree protocol may be applied to the loop path having a redundant configuration of PE apparatuses as shown in FIG. 2(b). Although protection can be provided by using this spanning tree protocol, the time required for switching is performed in units of a few seconds. Therefore, it is difficult to perform high speed switching from a primary PE apparatus to a secondary PE apparatus.

In a case where TDM is used as the End-to-End service, there is no protection technology as APS (Automatic Protection Switching) defined in SDH (Synchronous Digital Hierarchy). Therefore, it is necessary to perform switching from a primary PE apparatus to a secondary PE apparatus manually. Thus, it is difficult to perform high speed switching from a primary PE apparatus to a secondary PE apparatus.

In a case where ATM is used as the End-to-End service, switching can be performed by using a protection technology referred to as linear protection according to ITU (International Telecommunication Union). However, in a case of providing protection referred to as 1:1 Bidirectional, a primary PE apparatus and a secondary PE apparatus may not match. Furthermore, in a case where the mismatch occurs, it becomes necessary to manually perform recovery. Therefore, it is difficult to reliably perform high speed switching from a primary PE apparatus to a secondary PE apparatus.

Furthermore, in a case of providing protection to a redundant configuration of PE apparatuses, operations by a CE apparatus differ depending on the End-to-End service. Therefore, in a case where plural services are installed in a pseudowire, operations by the CE apparatus become complicated.

Therefore, it is difficult to provide reliable high speed protection to a redundant configuration of PE apparatuses.

SUMMARY OF THE INVENTION

It is a general object of the present invention to provide a protection providing method and a customer edge apparatus that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a protection providing method and a customer edge apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a protection providing method, in a network configuration having a customer edge apparatus redundantly connected to a first provider edge apparatus and a second provider edge apparatus, for setting a primary provider edge apparatus and a secondary provider edge apparatus with the customer edge apparatus, including: a first transmitting step for transmitting a first signaling message, received by the first provider edge apparatus when establishing a pseudowire, to the customer edge apparatus; a second transmitting step for transmitting a second signaling message, received by the second provider edge apparatus when establishing a pseudowire, to the customer edge apparatus; a receiving step for receiving the first and second signaling messages with the customer edge apparatus; a comparing step for comparing the first and second signaling messages with the customer edge apparatus; and a setting step for setting the primary provider edge apparatus and the secondary provider edge apparatus based on the comparison with the customer edge apparatus.

Furthermore, another embodiment of the present invention provides a customer edge apparatus in a network configuration redundantly connected to a first provider edge apparatus and a second provider edge apparatus for setting a primary provider edge apparatus and a secondary provider edge apparatus includes: a message receiving part configured to receive a first signaling message from the first provider edge apparatus and receive a second signaling message from the second provider edge apparatus; a comparing part configured to compare the first and second signaling messages; and a protection setting part configured to set the primary provider edge apparatus and the secondary provider-edge apparatus based on the comparison.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

First Embodiment

In the following first embodiment of the present invention, a method of providing unidirectional protection in a redundant configuration of a PE apparatus is described.

Figure 3:
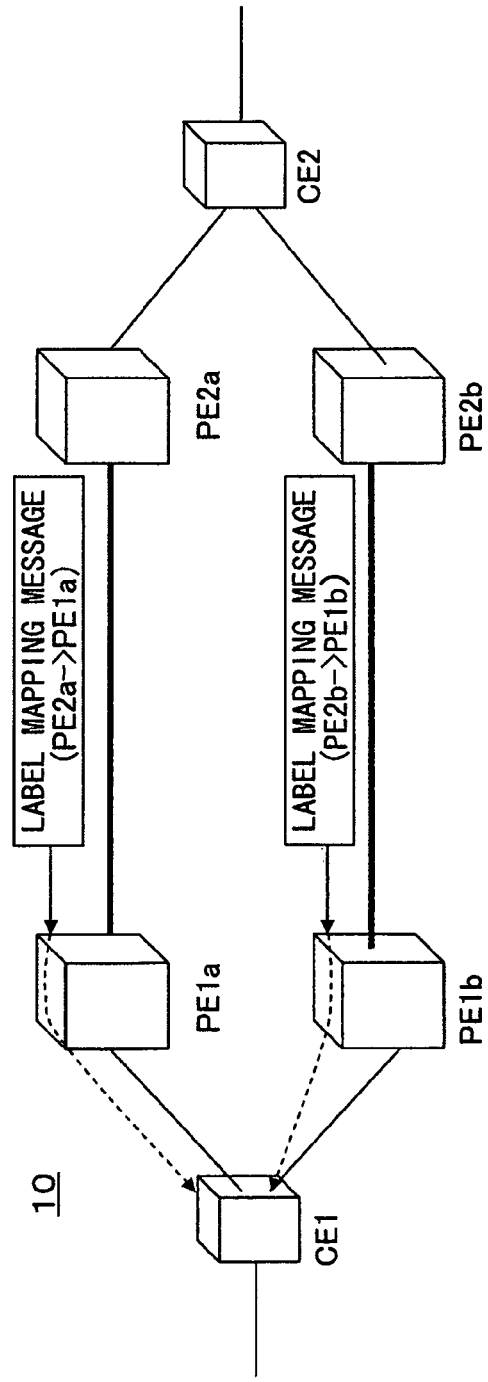
FIG. 3 is a diagram showing a communication system according to a first embodiment of the present invention.

FIG. 3 is a diagram showing a communication system 10 according to the first embodiment of the present invention. The communication system 10 includes customer edge apparatuses (CE apparatuses) CE1, CE2, main use (or auxiliary) provider edge apparatuses (PE apparatuses) PE1$a$, PE2$a$, and auxiliary (or main use) provider edge apparatuses PE1$b$, PE2$b$.

Figure 4:
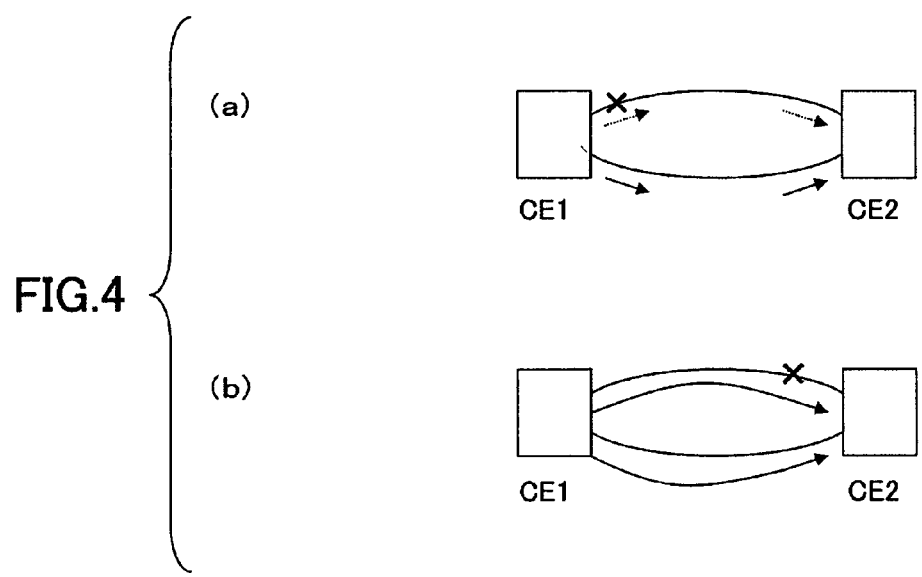
FIG. 4 is a diagram showing two types of unidirectional communication.

In order to provide unidirectional protection from the CE apparatus CE1 to the CE apparatus CE2, the PE apparatus PE2$a$ sets a pseudowire by using a signaling message with respect to the PE apparatus PE1$a$ while the PE apparatus PE2$b$ sets a pseudowire by using a signaling message with respect to the PE apparatus PE1$b$. The signaling message includes an identifier of a pseudowire, data indicating the type of unidirectional communication, and data indicating the destination and the service of the psuedowire. In MPLS, the signaling message corresponds to a label mapping message transmitted upon receiving a label requesting message. The identifier of the pseudowire corresponds to a label ID. The type of unidirectional communication according to an embodiment of the present invention is 1:1 Unidirectional or 1+1 Unidirectional. 1:1 Unidirectional is for providing unidirectional protection by blocking communications of a secondary path at a port of the transmitting side as shown in FIG. 4($a$). 1+1 Unidirectional is for providing unidirectional protection by blocking communications of a secondary path at a port of the receiving side as shown in FIG. 4($b$). The destination and the service of a pseudowire are identified by referring to a field(s) called Generalized PW ID FEC that identifies an Attachment Circuit between the CE apparatus and the PE apparatus.

According to the first embodiment of the present invention, the PE apparatus PE1$a$ and the PE1$b$ transmit a label mapping message to the CE apparatus CE1. The CE apparatus CE1 compares the label mapping messages from the PE apparatuses PE1$a$, PE1$b$. In a case where the Generalized PW ID FEC is the same, the CE apparatus CE1 determines that the PE apparatuses PE1$a$, PE1$b$ are redundant (redundant configuration). For example, the CE apparatus sets unidirectional protection by setting the one having a smaller label ID as a primary provider edge apparatus and the other one having a larger label ID as a secondary provider edge apparatus. For example, in a case where the type of unidirectional communication is 1:1 Unidirectional, the CE apparatus blocks the transmitting port.

Accordingly, by using the signaling messages between the PE apparatuses at the CE apparatus for selecting the primary PE apparatus and the secondary PE apparatus, high speed and highly reliable protection can be provided with respect to a redundant configuration of a PE apparatus.

First Embodiment: Flowchart of Protection Providing Method

A protection providing method according to the first embodiment of the present invention is described in detail with reference to FIG. 5.

A label mapping message is communicated (transmitted/ received) between PE apparatuses. More specifically, a PE apparatus PE2a transmits a label mapping message to a PE apparatus PE1a in response to a label requesting message (Step S101). The label mapping message includes a label ID, data indicating type of unidirectional communication (1:1 Unidirectional or 1+1 Unidirectional) and Generalized PW ID FEC. When the PE apparatus PE1a receives the label mapping message, the PE apparatus PE1a determines whether it is acceptable and transmits a label mapping message to the PE apparatus PE2a in a case where it is acceptable (Step S103). When this operation is completed, a pseudowire is established between the PE apparatus PE1a and the PE apparatus PE2a.

In this first embodiment, the PE apparatus PE1a, upon receiving the label mapping message from the PE apparatus PE2a, transmits a message having the same content as the received label mapping message to a CE apparatus CE1 for enabling CE apparatuses CE1, CE2 to select a primary PE apparatus and a secondary PE apparatus (Step S105). Furthermore, the PE apparatus PE2a, upon receiving the label mapping message from the PE apparatus PE1a, transmits a message having the same content as the received label mapping message to a CE apparatus CE2 (Step S107).

Likewise, label mapping messages are regularly communicated between a PE apparatus PE1b and a PE apparatus PE2b. More specifically, a PE apparatus PE1b transmits a label mapping message to a PE apparatus PE2b (Step S109). When the PE apparatus PE2b receives the label mapping message, the PE apparatus PE2b determines whether it is acceptable and transmits a label mapping message to the PE apparatus PE1b in a case where it is acceptable (Step S111). When this operation is completed, a pseudowire is established between the PE apparatus PE1b and the PE apparatus PE2b.

The PE apparatus PE2b, upon receiving the label mapping message from the PE apparatus PE1b, transmits a message having the same content as the received label mapping message to a CE apparatus CE2 (Step S113). Furthermore, the PE apparatus PE2b, upon receiving the label mapping message from the PE apparatus PE1b, transmits a message having the same content as this label mapping message to CE apparatus CE1 (Step S115).

Accordingly, the CE apparatus CE1 receives two label mapping messages from the PE apparatuses PE1a, PE1b connected thereto. Furthermore, the CE apparatus CE2 receives two label mapping messages from the PE apparatuses PE2a, PE2b. The CE apparatuses CE1, CE2 recognize that both PE apparatuses are redundantly configured in a case where the Generalized PW ID FEC included in the two label mapping messages are the same. Then, the CE apparatuses CE1, CE2 set a primary PE apparatus and a secondary PE apparatus depending on the size of the label ID. For example, the CE apparatuses CE1, CE2 set a port as a primary PE apparatus for one having a smaller label ID (Steps S115 and S117).

Figure 5:
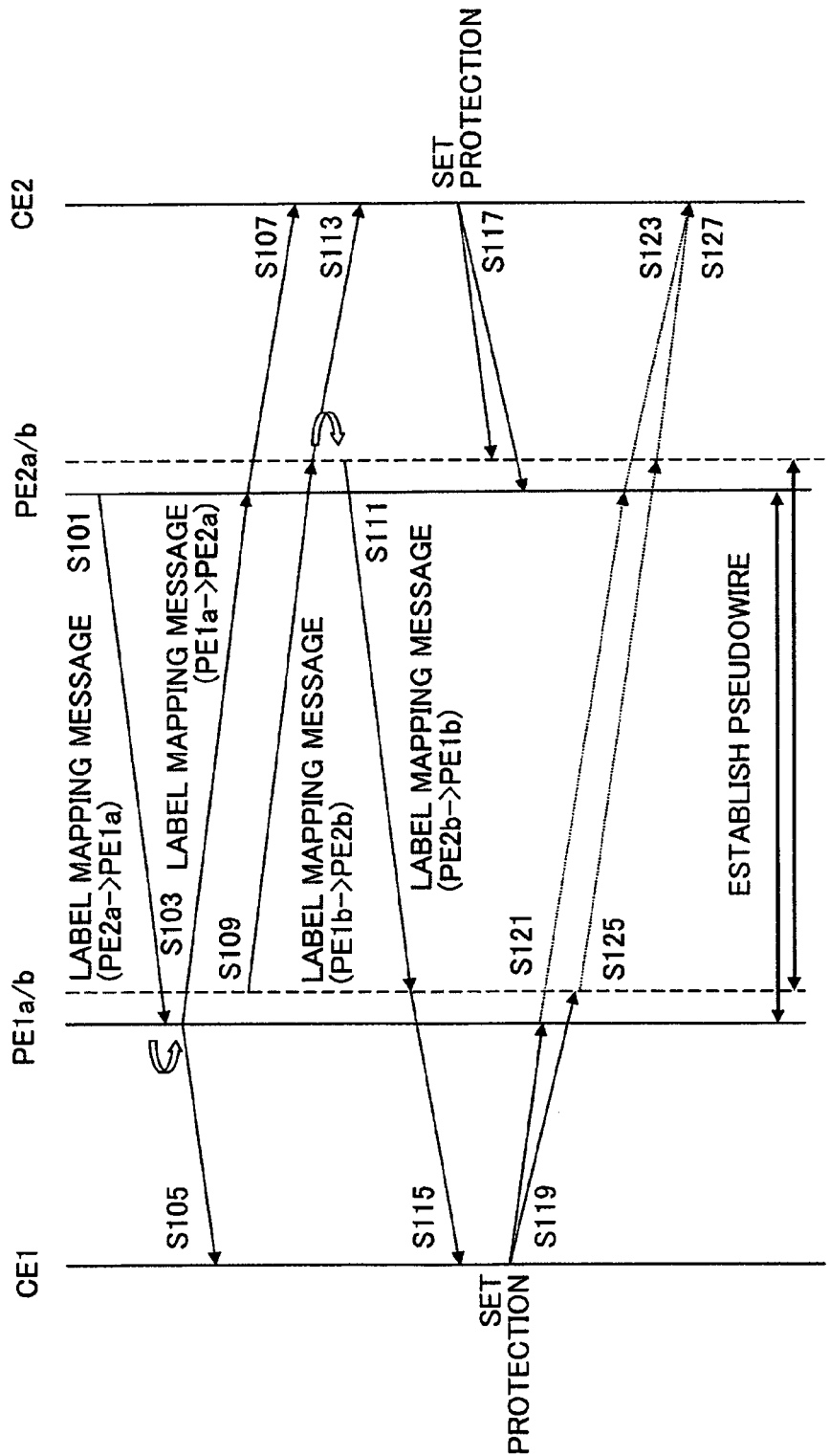
FIG. 5 is a flowchart of a protection providing method according to the first embodiment of the present invention.

In FIG. 5, Steps S109 through S115 are illustrated continuing from the operation of Steps S101 through S107, the operation of Steps S101 through S107 may be performed independently from the operation of Steps S109 through S115. For example, the operation of Steps S101 through S107 may be performed after the operation of Steps S109 through S115 or these operations may be performed simultaneously.

The CE apparatus CE2 refers to data indicating the type of unidirectional communication included in the label mapping message. In a case where the type of unidirectional communication is 1:1 Unidirectional, the CE apparatus CE1 sets protection by blocking a transmitting port. When the setting is completed, the CE apparatuses CE1, CE2 may transmit a setting completion message to connected PE apparatuses (Steps S117 and S119).

In a case where the unidirectional communication is 1+1 Unidirectional, the CE apparatus CE1 may discretionarily transmit a setting completion message to the CE apparatus CE2 via the PE apparatuses PE1a and PE2a which are set as main use PE apparatuses (Steps S121 and S123). Likewise, the CE apparatus CE1 may discretionarily transmit a setting completion message to the CE apparatus CE2 via the PE apparatuses PE1b and PE2b which are set as auxiliary PE apparatuses (Steps S125 and S127). When the CE apparatus CE2 receives the setting completion message, the CE apparatus CE2 may set protection by blocking a receiving port. When the setting of protection is completed, a pseudowire is established between the PE apparatuses.

Although the above-described case assumes that 1+1 Unidirectional or 1:1 Unidirectional is set by each of the CE apparatuses, the setting may be performed by a PE apparatus. In this case, it may be performed by including the setting of the type of protection in each message of Steps S105, S107, S113, and S115 and reporting the setting.

For example, in another case, 1:1 Unidirectional may be set to the label mapping message between the PE apparatus PE1a and the PE apparatus PE2a whereas 1+1 Unidirectional is set to the label mapping message between the PE apparatus PE1b and the PE apparatus 2b. In this case, 1:1 Unidirectional may be preferentially selected. This is because operation can be achieved more easily since 1:1 Unidirectional needs only to block the transmitting port and does not require the Steps S109 through S115.

In a case where failure occurs with the protection set in the above-described manner, data of the failure are reported to the CE apparatus CE2 of the receiving side in a case of 1+1 Unidirectional communication. Accordingly, the CE apparatus CE2 can switch the port of the receiving side. Furthermore, in a case of 1:1 Unidirectional communication, failure data are received by the CE apparatus CE2 of the receiving side and the failure data are reported to the CE apparatus CE1 of the transmitting side. Accordingly, the CE apparatus C1 can switch the port of the transmitting side.

First Embodiment: Exemplary Configuration of Customer Edge Apparatus and Provider Edge Apparatus Configurations of a customer edge apparatus (CE apparatus) CE1 and provider edge apparatuses (PE apparatus) PE1a, PE1b according to the first embodiment of the present invention are described with reference to FIG. 6.

The provider edge apparatuses PE1a, PE1b include message exchanging parts 101a, 101b, and message transferring parts 103a, 103b, respectively. The message exchanging parts 101a, 101b exchange signaling messages with an opposing provider edge apparatus. More specifically, the message exchanging parts 101a, 101b transmit/receive a label requesting message when establishing a pseudowire and transmit/ receive a label mapping message in accordance with the label requesting message. The message transferring parts 103a, 103b transmit the label mapping message received by the message exchanging parts 101a, 101b to the CE apparatus CE1.

The customer edge apparatus CE1 includes a message receiving part 111, a comparing part 113, a protection setting part 115, a protection switching part 117, and logical ports 119a, 119b. The message receiving part 111 receives a label mapping message from the PE apparatuses PE1a, PE1b via the logical ports 119a, 119b. As described above, the label mapping message includes a label ID, data indicating type of unidirectional communication (1:1 Unidirectional or 1+1 Unidirectional) and Generalized PW ID FEC. The comparing part 113 determines whether the Generalized PW ID FECs included in the label mapping messages received from both PE apparatuses PE1a, PE1b are the same. In a case where they are the same, the comparing part 113 recognizes that the PE apparatuses have a redundant configuration and compares the size of the label IDs. The protection setting part 115 sets, for example, the one having a smaller label ID as a primary PE apparatus and the other one having a larger label ID as a secondary PE apparatus. Furthermore, the protection setting part 115 refers to the data indicating type of unidirectional communication in the label mapping message and blocks one of logical ports 119a, 119b that is set corresponding to the secondary PE apparatus in a case of 1:1 Unidirectional communication. Whereas, in a case of 1+1 Unidirectional communication, the protection setting part 115 transmits data indicating settings of a primary PE apparatus and a secondary PE apparatus to an opposing CE apparatus via the logical ports 119a, 119b, and blocks a logical port that is set corresponding to a secondary PE apparatus by a protection setting part of the opposing CE apparatus. The protection switching part 117 switches logical ports corresponding to the primary PE apparatus and the secondary PE apparatus when a failure occurs in a transmission path or a communication apparatus.

Second Embodiment

In the second embodiment, a method of providing bidirectional protection with PE apparatuses having a redundant configuration is described.

Figure 7:
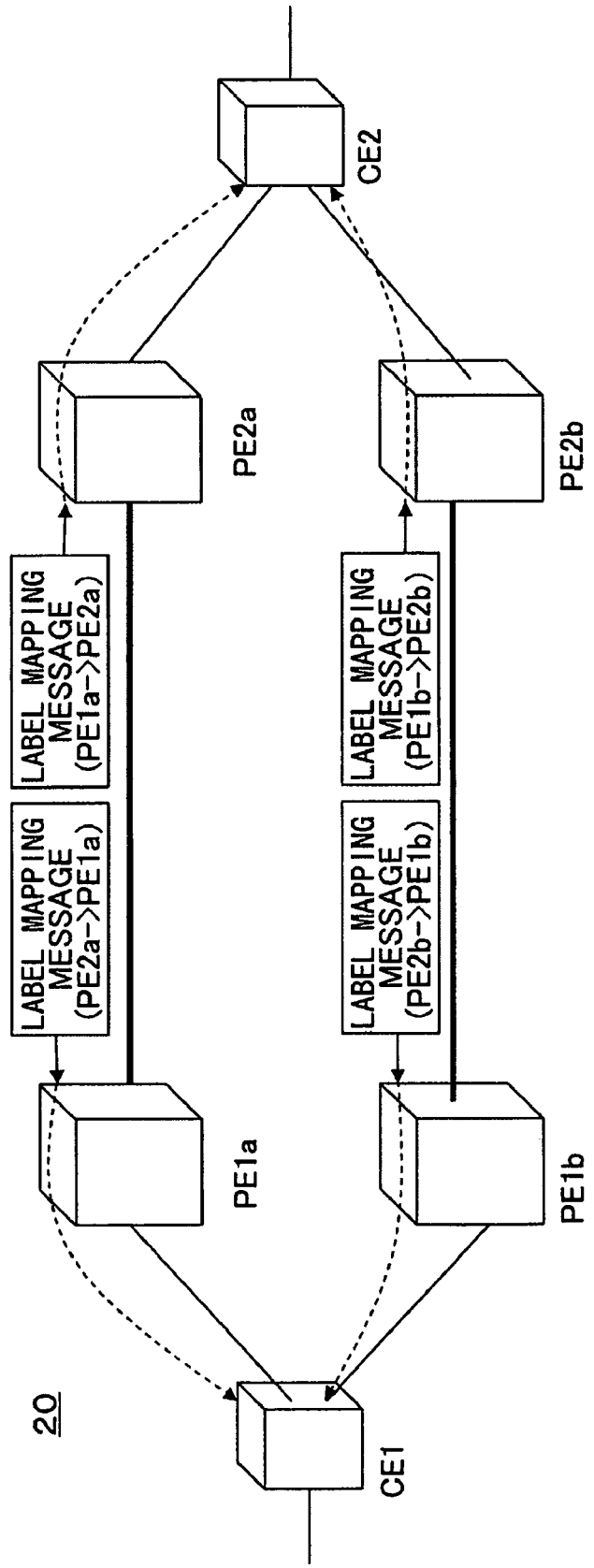
FIG. 7 is a diagram showing a communication system according to a second embodiment of the present invention.

FIG. 7 is a diagram showing a communication system 20 according to the second embodiment of the present invention. The communication system 20 is configured in the same manner as that shown in FIG. 3.

Figure 1:
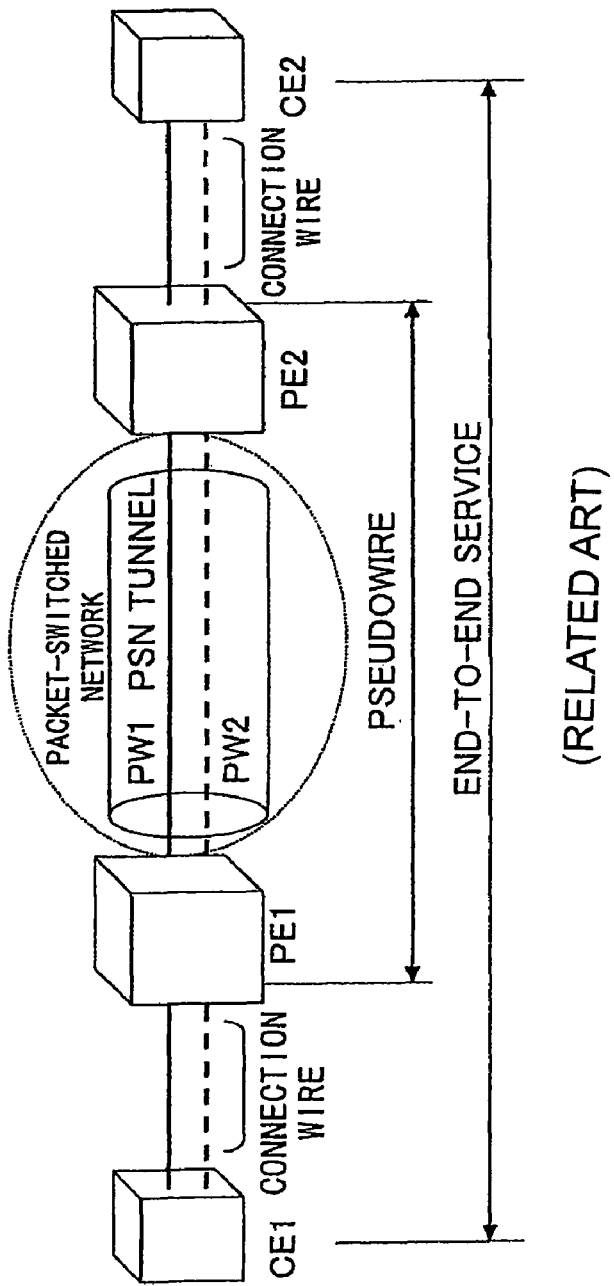
FIG. 1 is a diagram showing a reference model of PWE3.
Figure 2:
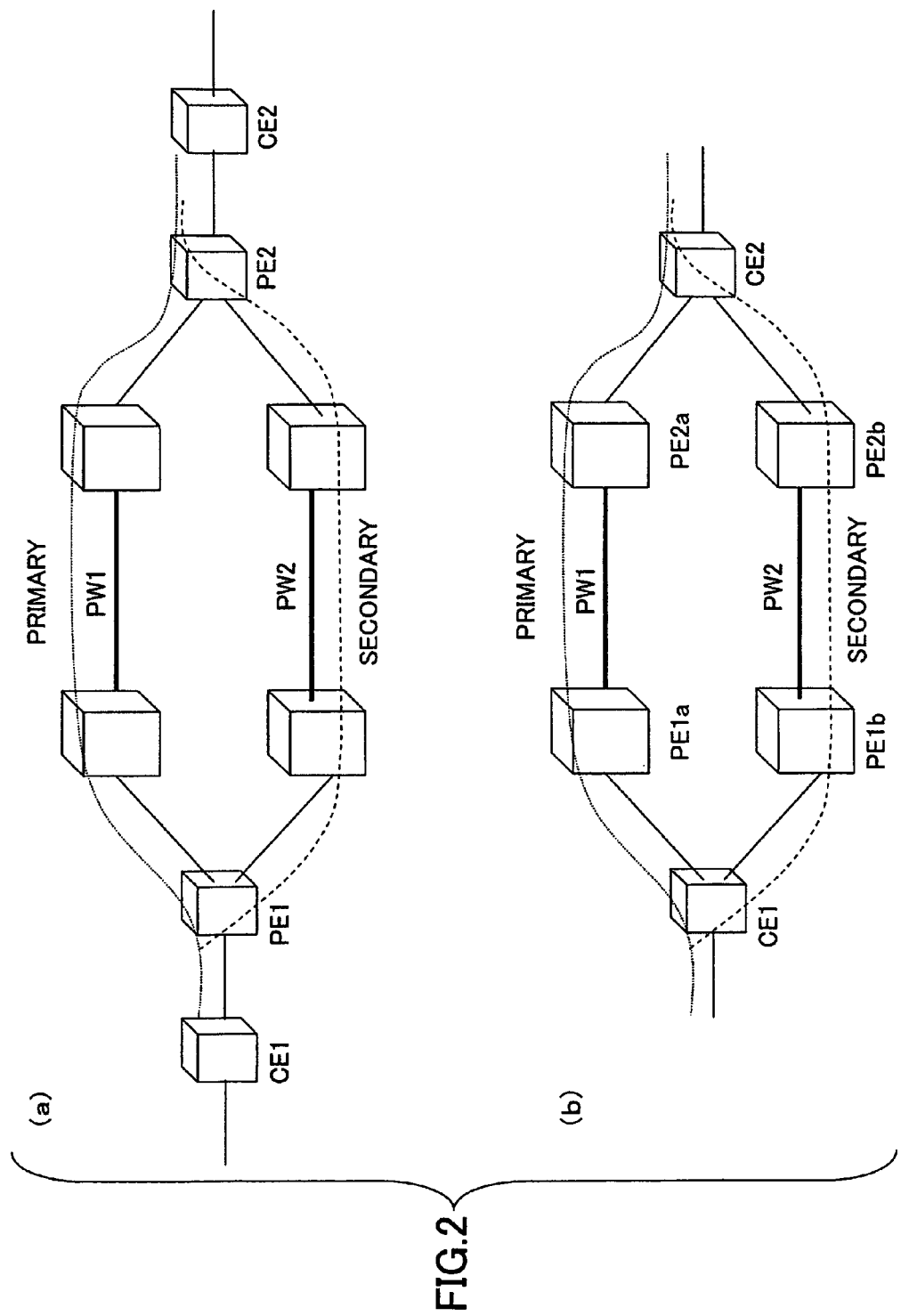
FIG. 2 is a diagram showing a redundant configuration of paths between PE apparatuses and a redundant configuration of PE apparatuses.
Figure 8:
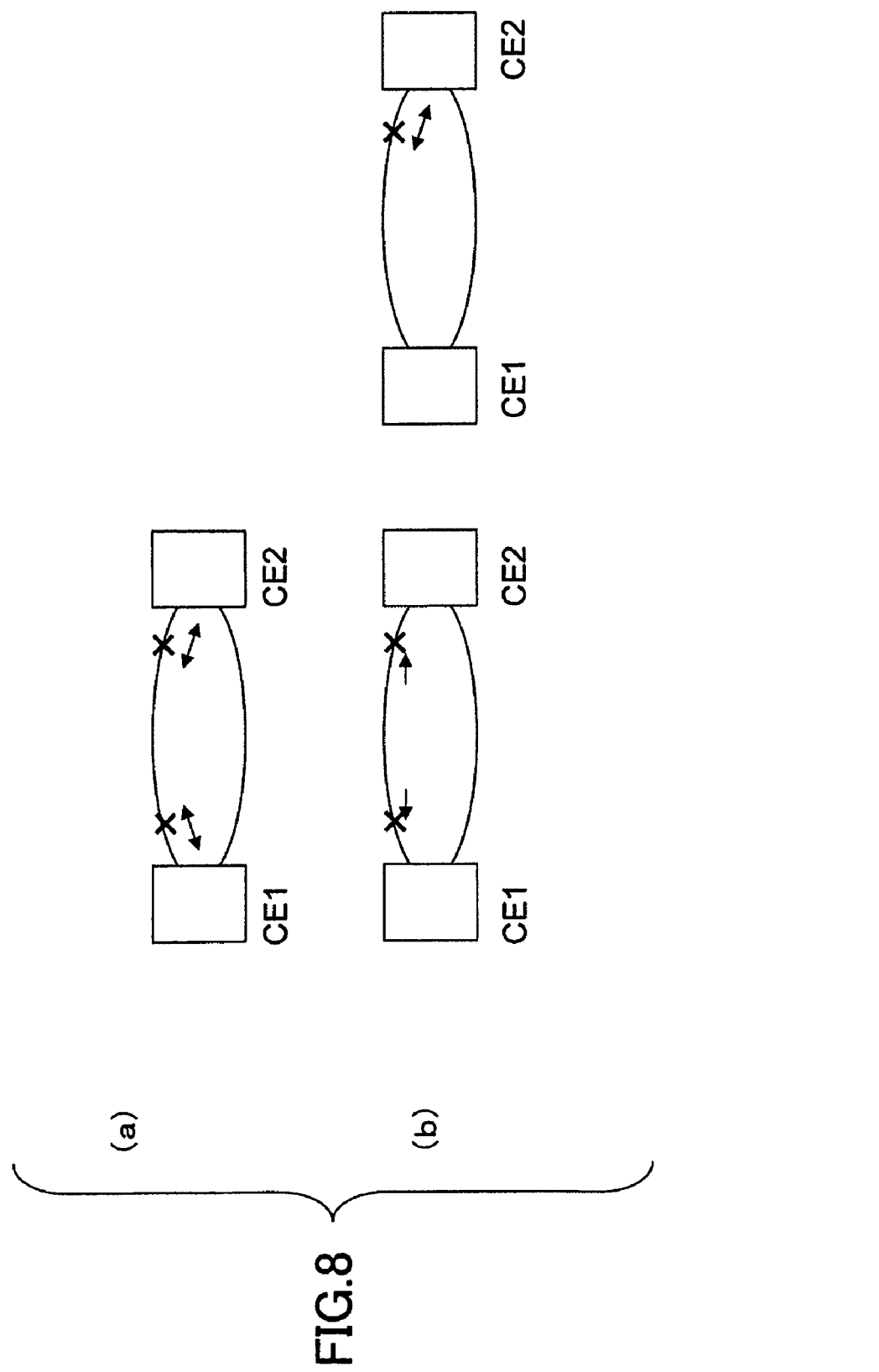
FIG. 8 is a diagram showing two types of bidirectional communication.

In order to provide bidirectional protection between a CE apparatus CE1 and a CE apparatus CE2, a PE apparatus PE2a sets a pseudowire with respect to a PE apparatus PE1a by using a signaling message while the PE apparatus PE1a sets a pseudowire in the opposite direction with respect to the PE apparatus PE2a by using a signaling message. Furthermore, a PE apparatus PE2b sets a pseudowire with respect to a PE apparatus PE1b by using a signaling message while the PE apparatus PE1b sets a pseudowire in the opposite direction with respect to the PE apparatus PE2b. As described above, the signaling message corresponds to a label mapping message and includes an identifier of a pseudowire, data indicating the type of bidirectional communication, and data indicating the destination and the service of the pseudowire. The type of bidirectional communication is 1:1 Bidirectional or 1+1 Bidirectional. It is to be noted that 1:1 Bidirectional is for providing bidirectional protection in which CE apparatuses on both sides each block the port of the transmitting side corresponding to the secondary PE apparatus as shown in FIG. 8(a), and 1+1 Bidirectional is for providing bidirectional protection in which CE apparatuses on both sides (or one side) block the port of the receiving side corresponding to the secondary PE apparatus as shown in FIG. 8(b).

In the second embodiment of the present invention, the label mapping message is transmitted from the PE apparatus PE1a and the PE apparatus PE1b to the CE apparatus CE1 and also from the PE apparatus PE2a and the PE apparatus PE2b to the CE apparatus CE2. The CE apparatuses CE1, CE2 compare both label mapping messages and recognize that both PE apparatuses are redundantly configured in a case where the Generalized PW ID FEC included in both label mapping messages are the same. For example, the one having a smaller label ID is set as a primary PE apparatus and the one having a larger label ID is set as a secondary PE apparatus, to thereby set protection for both directions. For example, in a case where the type of bidirectional communication is 1:1 Bidirectional, the CE apparatus blocks the port of the transmitting side.

Figure 9:
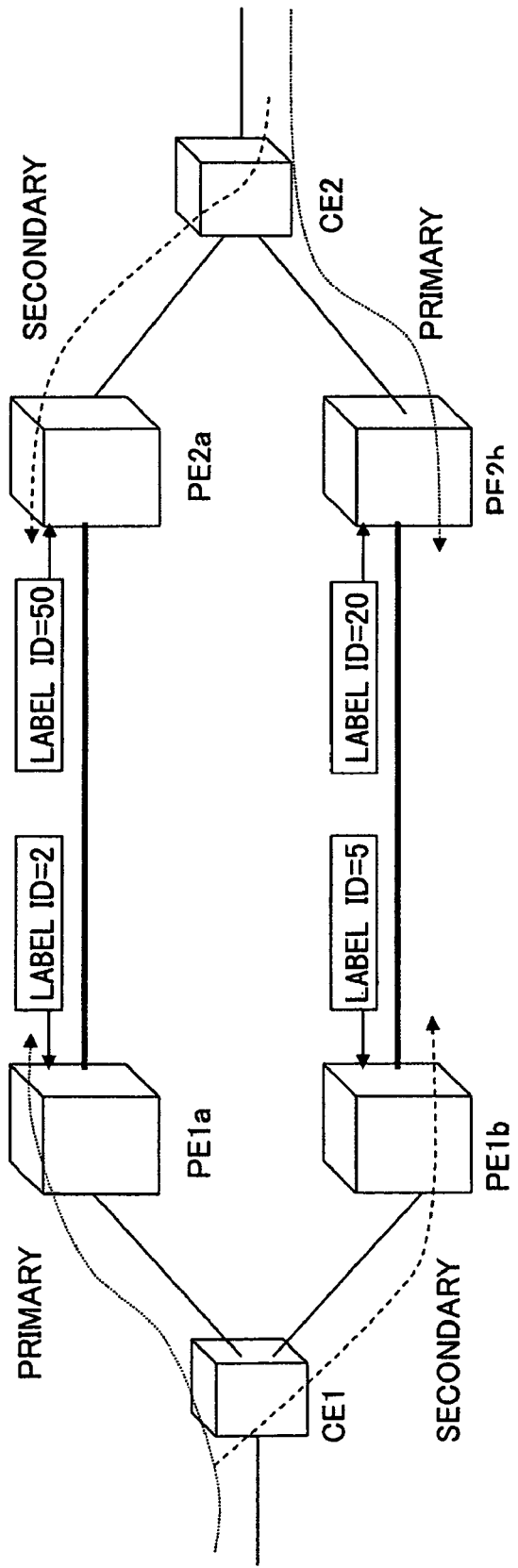
FIG. 9 is a diagram showing mismatch of settings which occurs in bidirectional communication.

However, in a case of bidirectional communication, it is possible that the settings of the primary PE apparatus and the secondary PE apparatus for the CE apparatus CE1 may not match with those of the CE apparatus CE2 as shown in FIG. 9. For example, it is supposed that the one having a smaller label ID is set as the primary PE apparatus. In a case where the label ID received from the PE apparatus PE1a is 2 and the label ID received from the PE apparatus PE1b is 5, the CE apparatus CE1 sets the PE apparatus PE1a as the primary PE apparatus and the PE apparatus PE1b as the secondary PE apparatus. Meanwhile, in a case where the label ID received from the PE apparatus PE2a is 50 and the label ID received from the PE apparatus PE2b is 20, the CE apparatus CE2 sets the PE apparatus 2a as the secondary PE apparatus and the PE apparatus 2b as the primary PE apparatus.

In order to avoid such mismatch of settings, the CE apparatuses CE1, CE2 refer to all label IDs of the pseudowire used in the bidirectional communication and set, for example, the one having a smaller label ID total value as the primary PE apparatus and the one having a larger label ID total value as the secondary PE apparatus, to thereby set bidirectional protection. By setting in this manner, mismatch can be avoided.

Accordingly, by allowing the CE apparatus to use the signal messages between the PE apparatuses for selecting the primary PE apparatus and the secondary PE apparatus, the CE apparatus can provide high speed and highly reliable protection with respect to PE apparatuses having a redundant configuration.

Second Embodiment: Flowchart of Protection Providing Method

A protection providing method according to the second embodiment of the present invention is described in detail with reference to FIG. 10.

A label mapping message is communicated (transmitted/received) between PE apparatuses. More specifically, a PE apparatus PE2a transmits a label mapping message to a PE apparatus PE1a in response to a label requesting message (Step S201). The label mapping message includes a label ID, data indicating type of bidirectional communication (1:1 Bidirectional or 1+1 Bidirectional) and Generalized PW ID FEC. When the PE apparatus PE1a receives the label mapping message, the PE apparatus PE1a determines whether it is acceptable and transmits a label mapping message to the PE apparatus PE2a in a case where it is acceptable (Step S203). When this operation is completed, a pseudowire is established between the PE apparatus PE1a and the PE apparatus PE2a.

In this second embodiment, the PE apparatus PE2a transmits data including two label IDs to be used in a bidirectional pseudowire as an affirmative response to the PE apparatus PE1a for enabling CE apparatuses CE1, CE2 to select a primary PE apparatus and a secondary PE apparatus (Step S204). The PE apparatus PE1a, upon receiving the data including the two label IDs, transmits a message having the same content as the received label mapping message together with the data including the two label IDs to the CE apparatus CE1 (Step S205). Furthermore, the PE apparatus PE2a, upon receiving the label mapping message from the PE apparatus PE1a, transmits a message having the same content as the received label mapping message together with the data including the two label IDs to the CE apparatus CE2 (Step S207).

Likewise, a label mapping message is regularly communicated between a PE apparatus PE1b and a PE apparatus PE2b. More specifically, a PE apparatus PE1b transmits a label mapping message to a PE apparatus PE2b (Step S209). When the PE apparatus PE2b receives the label mapping message, the PE apparatus PE2b determines whether it is acceptable and transmits a label mapping message to the PE apparatus PE1b in a case where it is acceptable (Step S211). When this operation is completed, a pseudowire is established between the PE apparatus PE1b and the PE apparatus PE2b.

The PE apparatus PE1b transmits data including two label IDs to be used in a bidirectional pseudowire as an affirmative response to the PE apparatus PE2b (Step S212). The PE apparatus PE2b, upon receiving the data including the two label IDs, transmits a message having the same content as the received label mapping message together with the data including the two label IDs to the CE apparatus CE2 (Step S213). Furthermore, the PE apparatus PE1b, upon receiving the label mapping message from the PE apparatus PE2b, transmits a message having the same content as the received label mapping message together with the data including the two label IDs to the CE apparatus CE1 (Step S215).

Accordingly, the CE apparatus CE1 receives two label mapping messages from the PE apparatuses PE1a, PE1b and also a total of four label IDs used in the bidirectional pseudowires. Furthermore, the CE apparatus CE2 receives two label mapping messages from the PE apparatuses PE2a, PE2b and also a total of four label IDs used in the bidirectional pseudowires. The CE apparatuses CE1, CE2 recognize that PE apparatuses of both directions are redundantly configured in a case where the Generalized PW ID FEC included in the two label mapping messages are the same. Then, the CE apparatuses CE1, CE2 set a primary PE apparatus and a secondary PE apparatus depending on the size of the total value of the label IDs. For example, the CE apparatuses CE1, CE2 set as a port as a primary PE apparatus for one having a smaller label ID (Steps S219 and S217).

Figure 10:
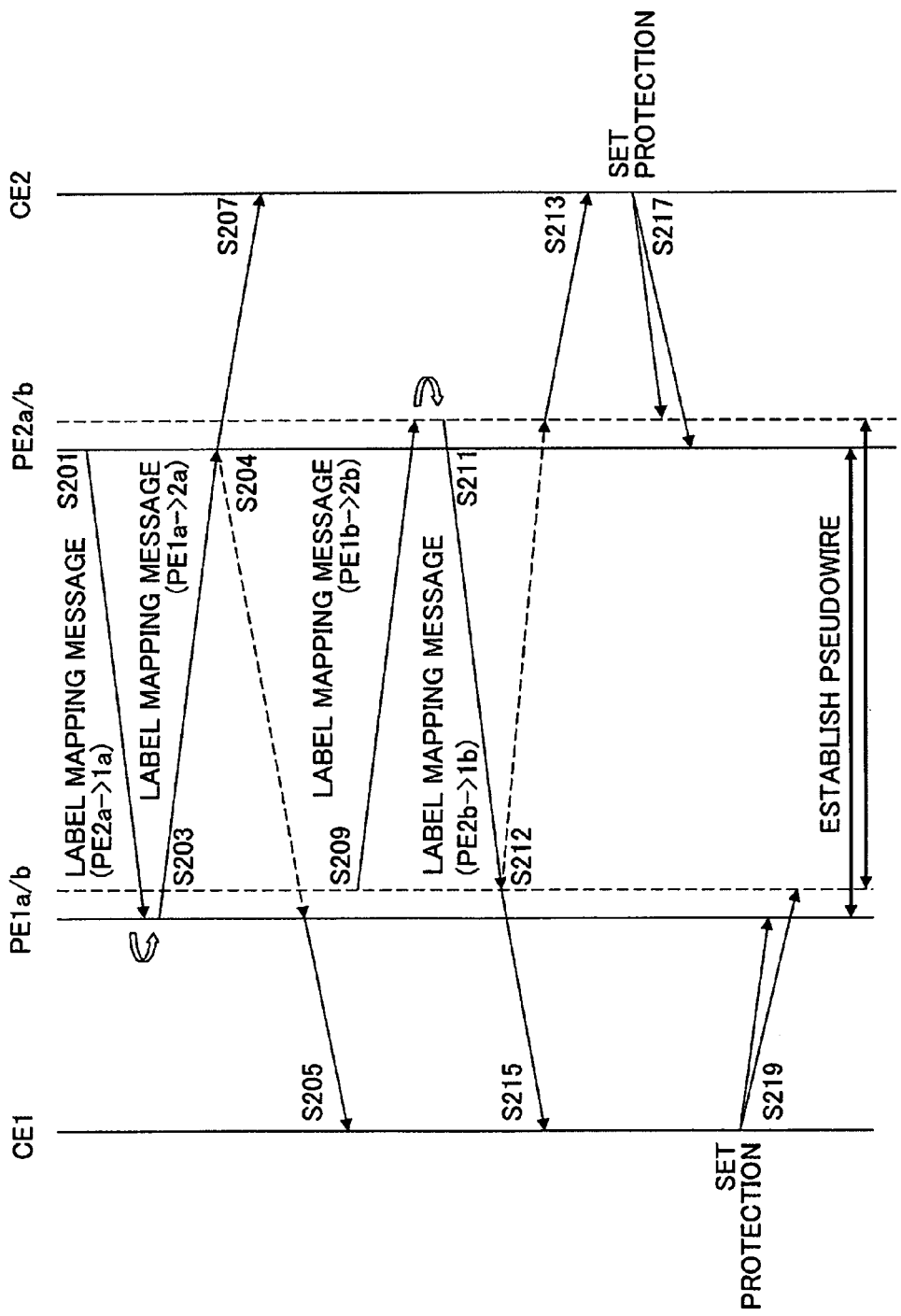
FIG. 10 is a flowchart of a protection providing method according to the second embodiment of the present invention.

In FIG. 10, Steps S209 through S215 are illustrated continuing from the operation of Steps S201 through S207, but the operation of Steps S201 through S207 may be performed independently from the operation of Steps S209 through S215. For example, the operation of Steps S201 through S207 may be performed after the operation of Steps S209 through S215 or these operations may be performed simultaneously.

The CE apparatus CE2 refers to data indicating the type of bidirectional communication included in the label mapping message. In a case where the type of bidirectional communication is 1:1 Bidirectional, the CE apparatus CE1 sets protection by blocking a port of the transmitting side. When the setting is completed, the CE apparatuses CE1, CE2 may transmit a setting completion message to connected PE apparatuses (Steps S217 and S219).

The same as FIG. 5, in a case where the bidirectional communication is 1+1 Bidirectional, the CE apparatus CE1 may discretionarily transmit a setting completion message to the CE apparatus CE2 via the PE apparatuses PE1a and PE2a which are set as main use PE apparatuses (not shown). Likewise, the CE apparatus CE1 may discretionarily transmit a setting completion message to the CE apparatus CE2 via the PE apparatuses PE1b and PE2b which are set as auxiliary PE apparatuses (not shown). When the CE apparatus CE2 receives the setting completion message, the CE apparatus CE2 may set protection by blocking a port of the receiving side. Once the setting of protection is completed, a pseudowire is established between the PE apparatuses. The same may be performed for the opposite direction in which the CE apparatus CE2 sets protection and transmits a setting completion message to the CE apparatus CE1. When the setting of protection is completed, a pseudowire is established between the PE apparatuses.

Instead of having the CE apparatus compare the label mapping messages and set the port corresponding to the primary PE apparatus and the port corresponding to the secondary PE apparatus as described above, the PE apparatus may compare the label mapping messages, set the port corresponding to the primary PE apparatus and the port corresponding to the secondary PE apparatus, and transmit the content of the settings to the CE apparatus.

Furthermore, there may be a case where, for example, 1:1 Bidirectional is set to the label mapping messages between the PE apparatus PE1a and the PE apparatus PE2a whereas 1+1 Bidirectional is set to the label mapping messages between the PE apparatus PE1b and the PE apparatus PE2b. In this case, the one to be preferentially selected may be set beforehand. Moreover, there may be a case where, for example, Unidirectional is set to the label mapping messages between the PE apparatus PE1a and the PE apparatus PE2a whereas Bidirectional is set to the label mapping messages between the PE apparatus PE1b and the PE apparatus PE2b. In this case also, the one to be preferentially selected may be set beforehand.

In a case where failure occurs with the protection set in the above-described manner, data of the failure are reported to the CE apparatus of the receiving side regardless of the type of communication. Accordingly, the CE apparatus can switch the port of the transmitting side or the receiving side.

Second Embodiment: Exemplary Configuration of Customer Edge Apparatus and Provider Edge Apparatus The CE apparatus and the PE apparatus according to the second embodiment can be configured the same as those shown in FIG. 6.

In order to avoid mismatch of the primary PE apparatus and the secondary PE apparatus as described above, the message exchanging parts 101a, 101b of the provider edge apparatus PE1a transmit a label mapping message received at the message exchanging part 101a, 101b together with data including two label IDs to be used in a bidirectional pseudowire to the CE apparatus CE1.

The comparing part 113 of the CE apparatus CE1 compares the size of the total value of the four label IDs to be used in the bidirectional pseudowire in a case where the Generalized PW ID FEC included in the label mapping messages received from the PE apparatuses PE1a are the same. For example, the protection setting part 115 of the CE apparatus CE1 sets the one having a smaller label ID total value as the primary PE apparatus and sets the one having a larger label ID total value as the secondary PE apparatus.

Since operations of the other elements are the same as those of the first embodiment, further explanation thereof is omitted.

Third Embodiment

In the above-described first and second embodiments, a pseudowire is established after the setting of the protection is completed. In the third embodiment of the present invention, label mapping messages are transmitted to the CE apparatuses CE1 and the CE2 after the label mapping messages between the PE apparatuses are transmitted/received and the pseudowire is established.

Figure 11:
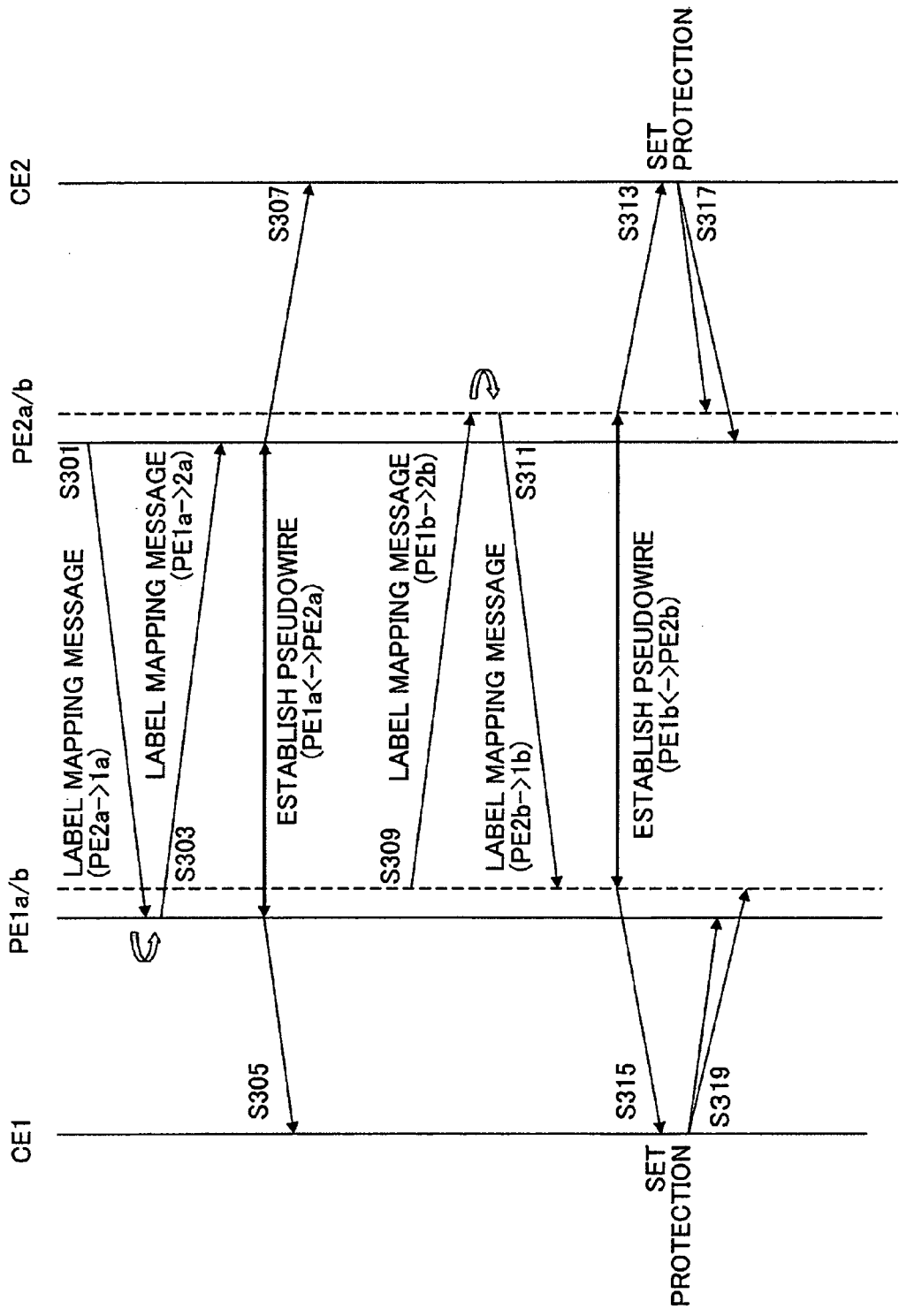
FIG. 11 is a flowchart of a protection providing method according to a third embodiment of the present invention.

A flowchart of a protection providing method of the third embodiment corresponding to FIG. 5 is shown in FIG. 11. FIG. 11 is the same as FIG. 5 except for the order of the flowchart. After a pseudowire is established between the PE apparatus PE1*a* and the PE apparatus PE2*a*, the PE apparatus PE1*a* transmits a label mapping message to the CE apparatus CE1 (Step S305) while the PE apparatus PE2*a* transmits a label mapping message to the CE apparatus CE2 (Step S307). Likewise, after a pseudowire is established between the PE apparatus PE1*b* and the PE apparatus PE2*b*, the PE apparatus PE1*b* transmits a label mapping message to the CE apparatus CE1 (Step S315) while the PE apparatus PE2*b* transmits a label mapping message to the CE apparatus CE2 (Step S313).

Protection can be provided for the bidirectional communication type according to the same flowchart.

Instead of the first and second embodiments where the primary PE apparatus and the secondary PE apparatus is selected by comparing label IDs, the third embodiment may set the port using an earlier established pseudowire as the port corresponding to the primary PE apparatus and set the port using a latter established pseudowire as the port corresponding to the secondary PE apparatus. Here, it is described that the port using the earlier established pseudowire is set as the port corresponding to the primary PE apparatus. However, the port using the earlier established pseudowire may be set as the secondary PE apparatus.

Figure 6:
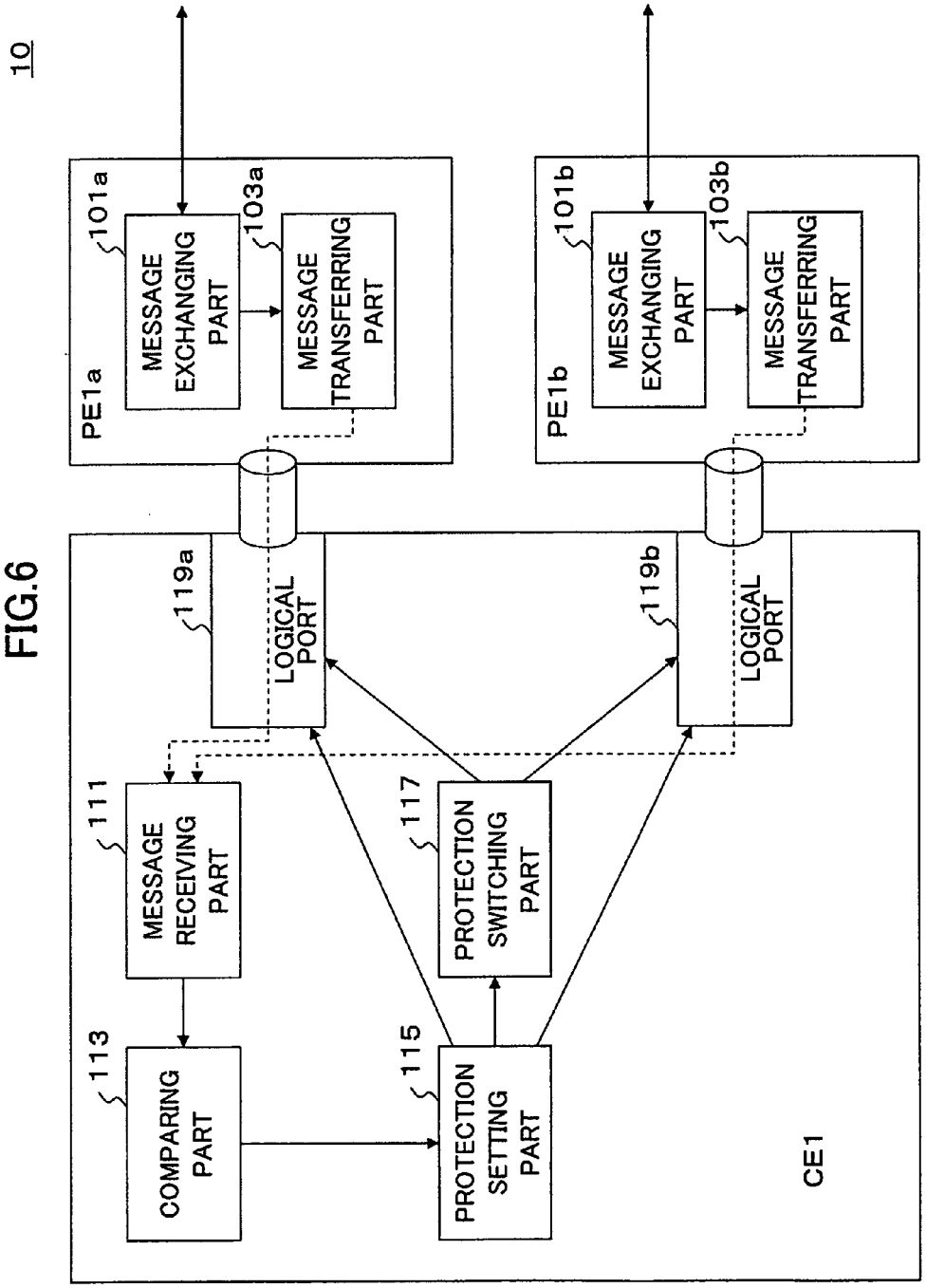
FIG. 6 is a diagram showing a configuration of a customer edge apparatus and a provider edge apparatus according to the first-fourth embodiments of the present invention.

Accordingly, the CE apparatus and the PE apparatus in the case where the port using the earlier established pseudowire as the port corresponding to the primary PE apparatus may be configured in the same manner as those of FIG. 6.

The comparing part 113 of the user apparatus CE1 shown in FIG. 6 does not need to compare label IDs but needs only to compare the order in which the label mapping message is received from the PE apparatuses PE1*a* and PE1*b*. For example, the protection setting part 115 of the user apparatus CE1 sets the port corresponding to the earlier received label mapping message as the primary port and the port corresponding to the latter received label mapping message as the secondary port.

Since operations of the other elements are the same as those of the first and second embodiments, further explanation thereof is omitted.

Fourth Embodiment

The fourth embodiment of the present invention describes a case of installing plural services in the same physical port of a CE apparatus wherein the setting of a primary port and a secondary port is performed in units of physical ports rather than logical ports.

Figure 12:
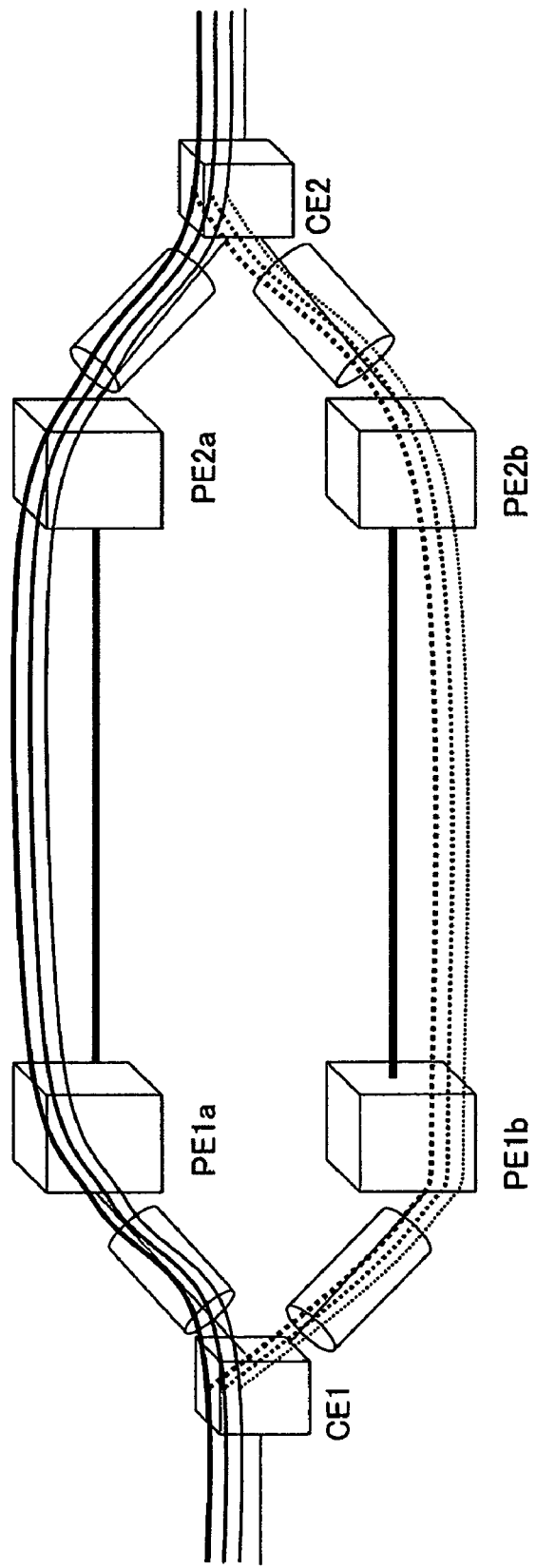
FIG. 12 is a diagram showing a communication system with plural services installed in the same physical port.

An example of a communication system installing plural services in the same physical port is shown in FIG. 12. In this case, instead of setting a primary port and a secondary port in units of logical ports, it is preferable to set the primary port and the secondary port in units of physical ports. By setting the ports in units of physical ports, only the physical ports need to be switched in a case where switching is needed due to failure in the line between PE apparatuses. Thereby, an advantage of simple switching can be attained.

Accordingly, in setting protection with a CE apparatus, reference is made to whether there is any setting-completed protection existing in a logical line using the same physical port. In a case where a setting-completed protection exists, the CE apparatus sets the primary port and the secondary port in the same manner as the protection which is already set regardless of the label ID or the order of receiving a label mapping message.

The CE apparatus and the PE apparatus according to the fourth embodiment may be configured in the same manner as those shown in FIG. 6 except for the point that the logical ports 119*a*, 119*b* of FIG. 6 are physical ports.

The comparing part 113 of the user apparatus CE1 shown in FIG. 6 determines whether there are any logical lines using the same physical port. In a case where no such logical line exists, the user apparatus CE1 operates in the same manner as that of the first-third embodiments. In a case where there is such a logical line, the user apparatus CE1 refers to a setting-completed protection. The protection setting part 115 of the customer edge apparatus CE1 sets the logical port for a primary port and the logical port for a secondary port in the same manner as the protection which is already set. The protection switching part 117 of the user apparatus CE1 does not switch logical ports but switches physical ports when a failure occurs in a transmission path or a communication apparatus.

Since operations of the other elements are the same as those of the first-third embodiments, further explanation thereof is omitted.

In the first-fourth embodiments, reference is made to a field referred to as Generalized PW ID FEC for identifying the service and the destination of the pseudowire. However, instead of referring to such a field, a field referred to as PW ID FEC which statically sets the ID of a pseudowire may be used. In a case of using the PW ID FEC, the same effects as the first-fourth embodiments can be attained by separately defining a service which emulates the pseudowire (e.g., VLAN, VCI/VPI).

With the above-described embodiments of the present invention, high speed and highly reliable protection with respect to a redundant configuration of a provider edge apparatus can be provided. Furthermore, protection independent from End-to-End service can be provided.

Further, the present invention is not limited to these embodiments, but variations and modifications may be made without departing from the scope of the present invention.

What is claimed is:

1. A protection providing method, in a network configuration having a customer edge apparatus redundantly connected to a first provider edge apparatus and a second provider edge apparatus, for setting a primary provider edge apparatus and a secondary provider edge apparatus with the customer edge apparatus, comprising:

transmitting a first signaling message, received by the first provider edge apparatus when establishing a first pseudowire, to the customer edge apparatus;

transmitting a second signaling message, received by the second provider edge apparatus when establishing a second pseudowire, to the customer edge apparatus;

receiving the first and second signaling messages by the customer edge apparatus;

comparing the first and second signaling messages by the customer edge apparatus; and setting the primary provider edge apparatus and the secondary provider edge apparatus based on the comparison by the customer edge apparatus.

2. The protection providing method as claimed in claim 1, wherein the first and second signaling messages include an identifier of a respective pseudowire, data indicating the type of bidirectional or unidirectional communication, and data indicating a destination of the respective pseudowire and a service.

3. The protection providing method as claimed in claim 2,
wherein the customer edge apparatus compares the identifier of the first pseudowire included in the first signaling message with the identifier of the second pseudowire included in the second signaling message in a case where the data indicating the destination of the first pseudowire and the service included in the first signaling message are the same as the destination of the second pseudowire and the service included in the second signaling message;

wherein the customer edge apparatus sets the primary provider edge apparatus and the secondary provider edge apparatus based on the data indicating the type of bidirectional or unidirectional communication and a value of the identifier of the respective pseudowire included in the first and second signaling messages.

4. The protection providing method as claimed in claim 3, wherein the customer edge apparatus preferentially selects a predetermined one of the type of bidirectional or unidirectional communication in a case where the data indicating the type of bidirectional or unidirectional communication included in first and second signaling messages are different.

5. The protection providing method as claimed in claim 2, wherein when the customer edge apparatus communicates with bidirectional type communication, the first provider edge apparatus attaches an identifier of a third pseudowire, included in a third signaling message to be transmitted when establishing the third pseudowire, to the first signaling message received when establishing the first pseudowire, and transmits an identifier of a first bidirectional pseudowire to the customer edge apparatus, the second provider edge apparatus attaches an identifier of a fourth pseudowire, included in a fourth signaling message to be transmitted when establishing the fourth pseudowire, to the second signaling message received when establishing the second pseudowire, and transmits an identifier of a second bidirectional pseudowire to the customer edge apparatus, the customer edge apparatus compares the identifier of the first bidirectional pseudowire included in the first signaling message and the identifier of the second bidirectional pseudowire included in the second signaling message, and the customer edge apparatus sets the primary provider edge apparatus and the secondary provider edge apparatus based on data indicating the type of bidirectional communication and the values of the identifiers of the first and second bidirectional pseudowires included in the first and second signaling messages.

6. The protection providing method as claimed in claim 1, wherein
the first provider edge apparatus transmits the first signaling message to the customer edge apparatus after the first pseudowire is established, and
the second provider edge apparatus transmits the second signaling message to the customer edge apparatus after the second pseudowire is established.

7. The protection providing method as claimed in claim 1, wherein
the customer edge apparatus compares the received order of the first and second signaling messages, and
the customer edge apparatus sets the primary provider edge apparatus and the secondary provider edge apparatus based on the received order.

8. The protection providing method as claimed in claim 1, wherein
the customer edge apparatus further determines whether there exists an already completed protection setting for a logical line using a physical port associated with transmitting the first and second signaling messages, and
in a case where an already completed protection setting exists, the primary provider edge apparatus and the secondary provider edge apparatus are set in the same manner as the already completed protection setting.

* * * * *